(12) United States Patent
Yoshikawa

(10) Patent No.: US 8,143,547 B2
(45) Date of Patent: Mar. 27, 2012

(54) CLOCKWISE AND COUNTERCLOCKWISE ROTATION SWITCHING DEVICE FOR POWER TOOL

(75) Inventor: Syuji Yoshikawa, Aichi (JP)

(73) Assignee: Makita Corporation, Anjo (JP)

( * ) Notice: Subject to any disclaimer, the term of this patent is extended or adjusted under 35 U.S.C. 154(b) by 419 days.

(21) Appl. No.: 12/219,678

(22) Filed: Jul. 25, 2008

(65) Prior Publication Data

US 2009/0057123 A1    Mar. 5, 2009

(30) Foreign Application Priority Data

Aug. 27, 2007 (JP) .................. 2007-219963

(51) Int. Cl.
*H01H 1/16* (2006.01)
(52) U.S. Cl. ........................ 200/567; 200/568
(58) Field of Classification Search ............ 200/567
See application file for complete search history.

(56) References Cited

U.S. PATENT DOCUMENTS

| 3,299,225 A | * | 1/1967 | Heath | 200/6 B |
| 3,971,904 A | * | 7/1976 | Ward | 200/6 BB |
| 6,143,994 A | * | 11/2000 | Thivilier | 200/11 R |

FOREIGN PATENT DOCUMENTS

| JP | A-2003-180054 | 6/2003 |
| JP | A-2007-143314 | 6/2007 |
| JP | A-2007-143346 | 6/2007 |

* cited by examiner

*Primary Examiner* — Elvin G Enad
*Assistant Examiner* — Lisa Homza
(74) *Attorney, Agent, or Firm* — Oliff & Berridge, PLC

(57) ABSTRACT

A clockwise and counterclockwise rotation switching device of a power tool is capable of effectively suppressing chattering or fusing of an elastic end to improve contact durability. An end part of a fixed contact is formed to be an elastic end deformed by contacting a movable contact. A unit base includes a regulation projection which is abutted with the elastic end, which is deformed in contact with the movable contact, so as to regulate the deformation quantity.

12 Claims, 7 Drawing Sheets

CLOCKWISE AND COUNTERCLOCKWISE ROTATION SWITCHING DEVICE FOR POWER TOOL

This application claims the entire benefit of Japanese Patent Application Number 2007-219963 filed on Aug. 27, 2008, the entirety of which is incorporated by reference.

BACKGROUND OF THE INVENTION

1. Field of the Invention

The present invention relates to a clockwise and counterclockwise rotation switching device provided on a motor-driven power tool for switching a rotation direction of a motor.

2. Description of the Background Art

A clockwise and counterclockwise rotation switching device for a power tool includes a unit base being fixed to a stator of a motor in a housing and having a pair of fixed contacts electrically connected with a coil of the stator, respectively, and a ring-shaped brush base holding a pair of carbon brushes, which face a commutator with the surface thereof in sliding contact with the commutator, and being rotatably attached to the unit base. A pair of movable contacts is provided between the fixed contacts in the brush base, respectively. Clockwise or counterclockwise rotation of the motor can be selected by switching a contact mode of both the movable contacts with respect to the fixed contacts, the switching being caused by a rotating operation of the brush base (for example, refer to Japanese Unexamined Patent Publication No. 2003-180054).

FIG. 6 is a resolved perspective view to illustrate a particular example of a clockwise and counterclockwise rotation switching device. FIG. 7 is an assembled perspective view of the device. In a clockwise and counterclockwise switching device 1, a disk-ring shaped unit base 2 is fixed to a stator of a motor, and a short sleeve shaped brush base 3 is coaxially attached at an upper part of the unit base 2 and has the approximately same diameter as that of the unit base 2. Both the unit base 2 and the brush base 3 are made of a synthetic resin.

The unit base 2 includes a pair of circular-shaped fixed contacts 4 and 4 in a plane view in a point symmetric manner. An end part of the each fixed contact 4 mutually faces the other fixed contact with a predetermined interval therebetween in a peripheral direction, and serves also as elastic end 4a being movable in a radius direction. An insertion piece 5 is continuously connected with each fixed contact 4 and inserted into one pair of terminals on a coil side of the stator so as to be electrically connected. Lower ends of terminal metals 6 and 6 are inserted into the other pair of terminals on the coil side and upper ends thereof are connected with a switch. Connection parts 7, 7, connected to the terminal end of the stator with holding the insertion piece 5 and the terminal fitting 6 are formed at a lower side of the unit base 2. Further, a pair of hooks 8 and 8 is upwardly projected at an inner periphery of the unit base 2. An upper end of each of the hooks 8 and 8 is outwardly folded. The hook 8 is engaged with recessed parts 9 and 9 formed in the peripheral direction on an inner periphery of the brush base 3, so that the brush base 3 is rotatably connected on the unit base 2.

Then, the brush base 3 is equipped with square sleeve shaped metallic brush holders 10 and 10 on a straight line at positions of point symmetry. The brush holder 10 can hold a carbon brush (not illustrated) mounted thereon. Further, as illustrated in FIG. 8A and FIG. 8B each brush holder 10 is connected with movable contacts 11 and 11 lower ends of which project and abut with lower ends of the brush base 3 at the point symmetry positions of the brush base 3. Each movable contact 11 is projected between the fixed contacts 4 and 4 of the unit base 2.

Therefore, when the movable contacts 11 and 11 are moved in the peripheral direction caused by the rotation of the brush base 3, the movable contacts 11 and 11 are moved to the inner peripheral side of two pairs of the elastic ends 4a and 4a which becomes point symmetry at the fixed contacts 4 and 4, and contacted with the elastic end 4a while outwardly bending the elastic end 4a on the outer periphery side. Then, the clockwise and counterclockwise rotation of the motor is switched. In addition, FIG. 8A and FIG. 8B illustrate a neutral state in which the movable contacts 11 and 11 are not contacted with any fixed contact 4. Further, the brush base 3 has operation projections 12 and 12 on the side thereof, and each operation projections 12 is outwardly projected through a window formed on the side of the housing of the power tool. The operation projections 12 and 12 enable the brush base 3 to be rotationally operated from outside of the housing.

SUMMARY OF THE INVENTION

When the fixed contact 4 has the elastic end 4a as an end part thereof, a contact pressure between the fixed contact 4 and an opposing movable contact 11 can be adjusted by the elastic property of the elastic end 4a. However, when the elastic end 4a is used at an approximately upper limit in an elastic region in order to increase the contact pressure, the elastic end 4a is plastic-deformed because of influences of heat and vibration, so that the contact pressure decreases and the elastic end 4a may be chattered or fused.

An object of the present invention is to provide a clockwise and counterclockwise rotation switching device for a power tool, which has a simple structure, can effectively suppress chattering or fusing of an elastic end due to decrease in a contact pressure, and can improve contact durability.

In order to achieve the above-described object, a first aspect of the preset invention provides a clockwise and counterclockwise rotation switching device for a power tool which can select clockwise rotation or counterclockwise rotation of a motor. The clockwise and counterclockwise rotation switching device includes a unit base being fixed in a housing of the power tool and having a pair of fixed contacts connected with a coil of a motor, and a brush base rotatably provided to the unit base while holding a brush of the motor, having a pair of movable contacts positioned between the fixed contacts, and switching a contacting mode of the movable contact with respect to the fixed contact by a rotating operation. An end part of any one of contacts of the fixed contact and the movable contact is formed to be an elastic end which deforms in contact with another contact. The unit base or the brush base includes a regulation part regulating a deformation quantity of the elastic end which deforms upon the fixed contact being contacted with the movable contact, by abutting the elastic end.

In order to prevent chattering of the elastic end more reliably, it is preferable that the regulation part has elasticity so as to deform upon abutting to the elastic end.

According to the present invention, it is possible to improve contact durability by preventing the decrease of a contact pressure of an elastic end with respect to heat and vibration, whereby suppressing chattering or fusing effectively. Particularly, this effect can be obtained with a simple structure in which a regulation part is provided. Thus, an increase in cost can be minimized.

Further, when the regulation part has elasticity, a problem due to dimensional tolerance does not occur, and a space between the regulation part and the elastic end is not formed. Therefore, chattering or fusing of the elastic end can be suppressed more accurately.

BRIEF DESCRIPTION OF THE DRAWINGS

FIG. 1A and FIG. 1B illustrate a unit base of a clockwise and counterclockwise rotation switching device of an embodiment 1, wherein FIG. 1A is a perspective view, and FIG. 1B is a partial enlarged view;

FIG. 2A and FIG. 2B illustrate a unit base having fixed contacts, wherein FIG. 2A is a plane view, and FIG. 2B is a partial enlarged view; rewritten paragraph:

FIG. 3A is a perspective view, and FIG. 3B is a partial enlarged view;

FIG. 8A and FIG. 8B illustrate a unit base so as to collectively illustrate movable contacts, wherein FIG. 8A is a plane view, and FIG. 8B is an enlarged view of a B part.

DESCRIPTION OF THE PREFERRED EMBODIMENTS

Figure 6:
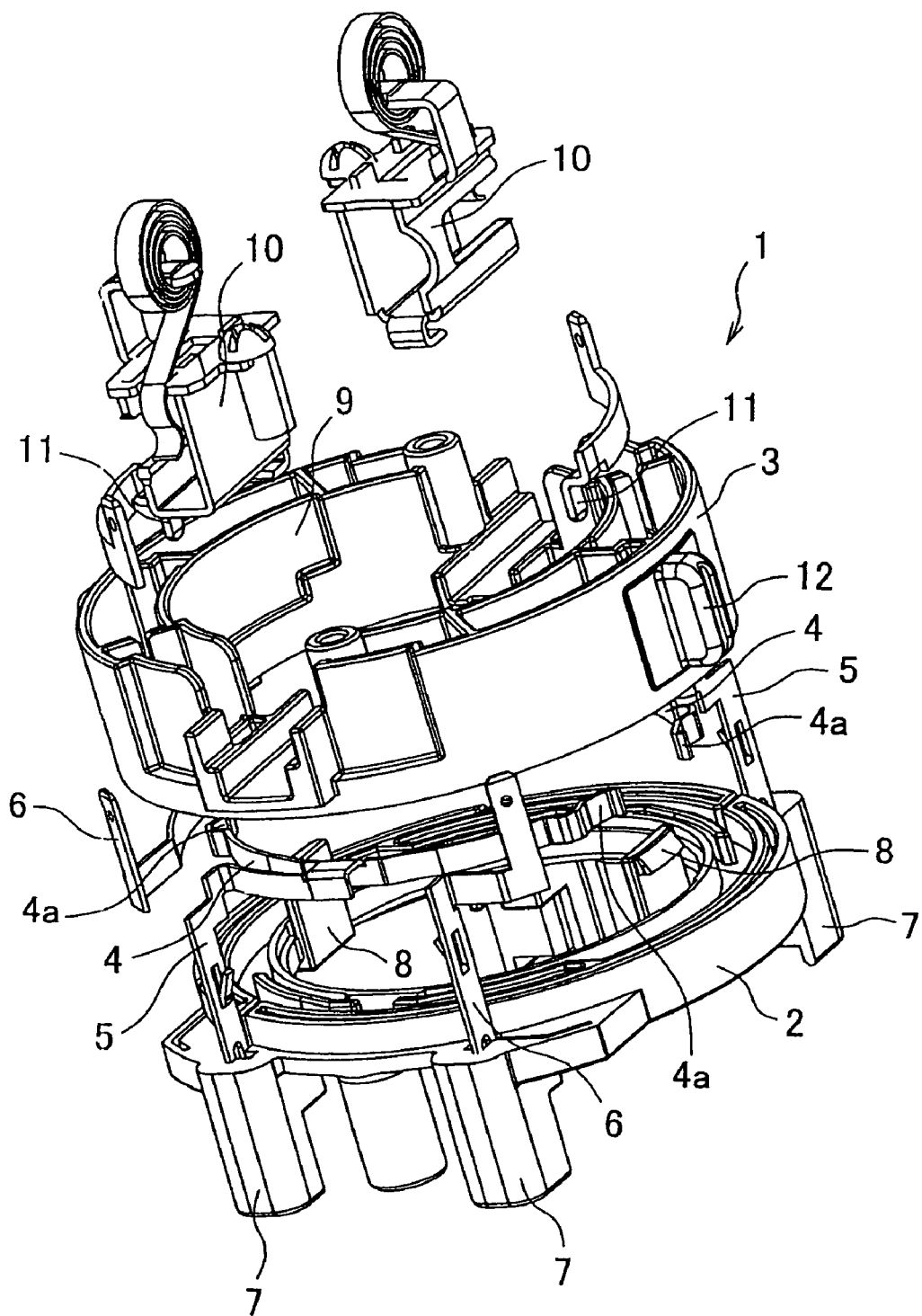
FIG. 6 is a resolved perspective view of a conventional clockwise and counterclockwise rotation switching device.
Figure 7:
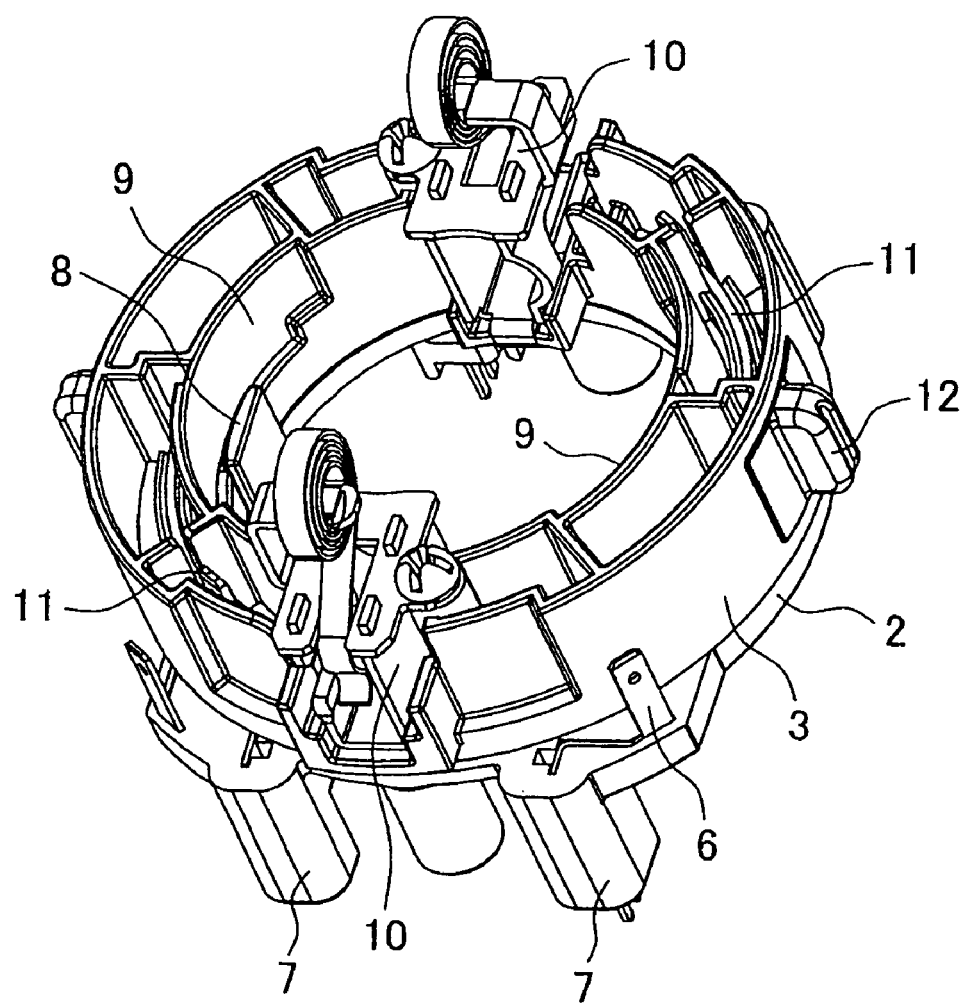
FIG. 7 is a perspective view of the conventional clockwise and counterclockwise rotation switching device.
Figure 8A:
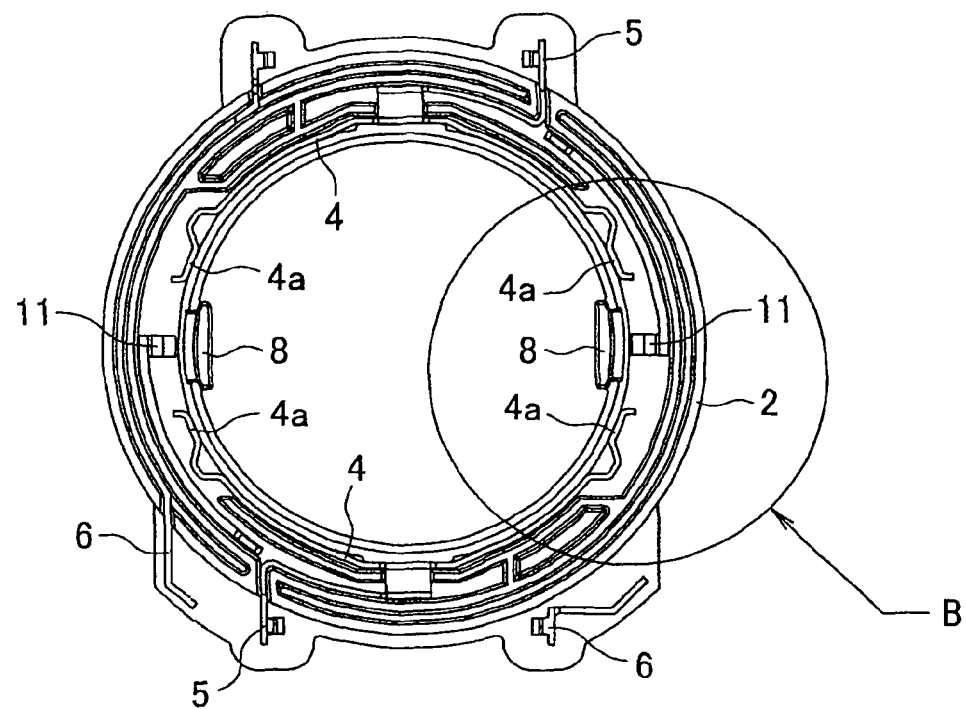
Figure 8B:
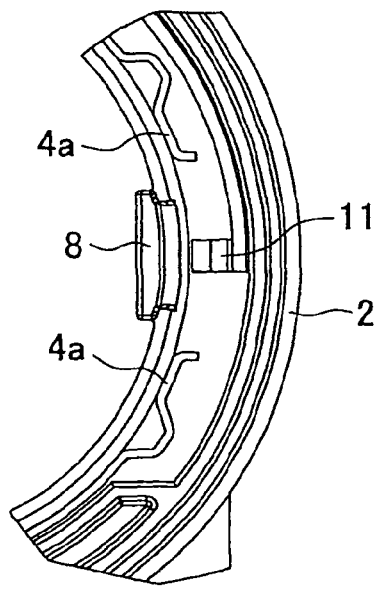

Embodiments of the present invention will be described below referring to the drawings. However, a basic structure of a clockwise and counterclockwise rotation switching device is similar to a conventional structure described in FIGS. 6 to 8. Thus, the same numerals are used to the same constitutional parts so as to omit the descriptions, and different constitutional parts from those of a conventional structure will be mainly described.

Embodiment 1

Figure 1A:
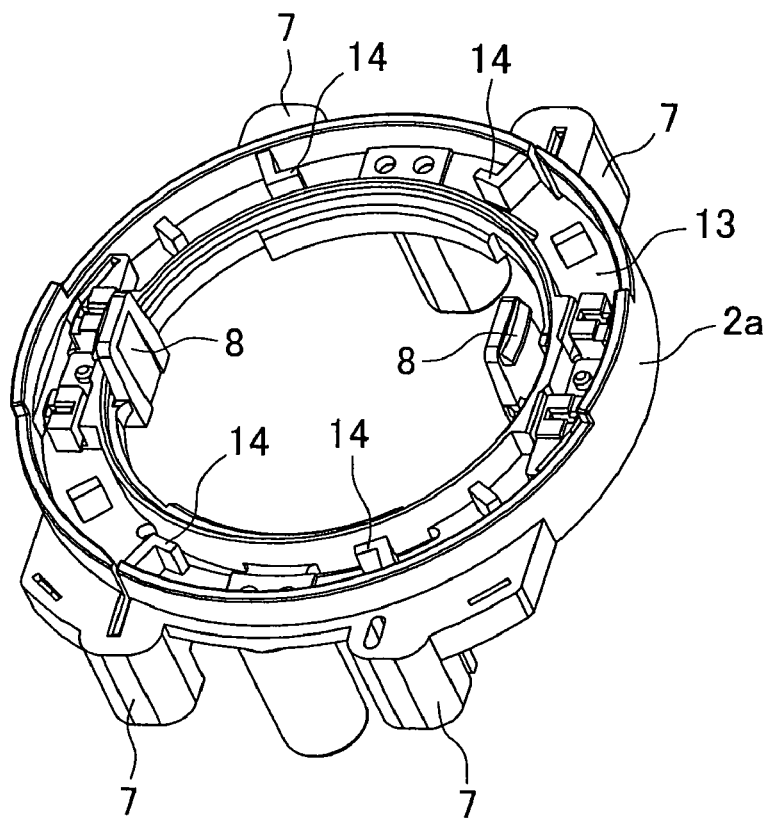
Figure 1B:
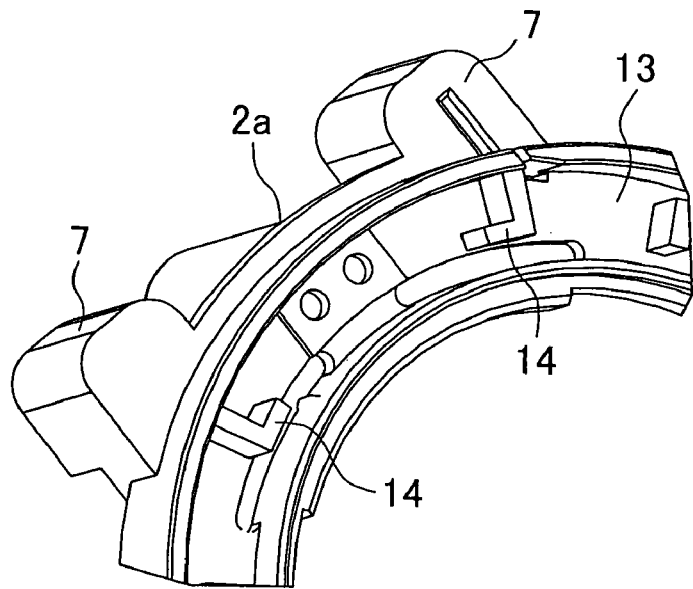
Figure 2A:
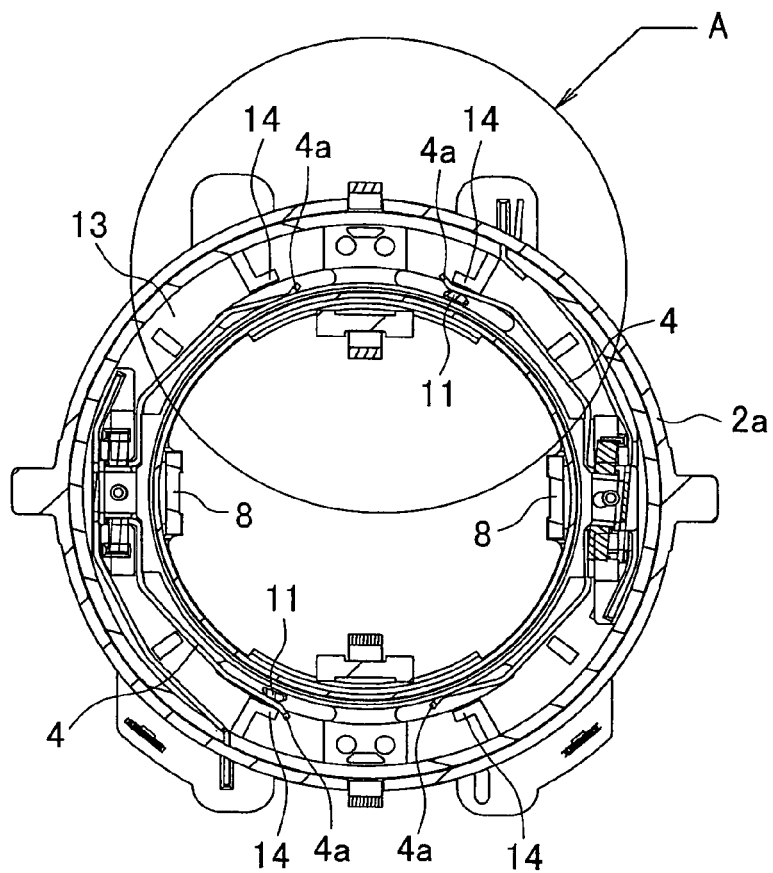
Figure 2B:
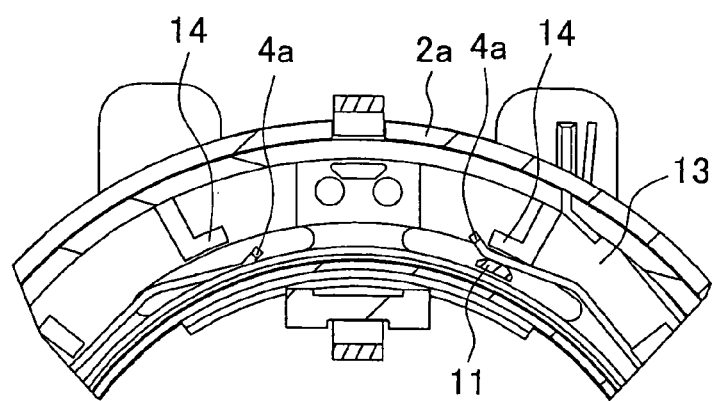

FIG. 1A and FIG. 1B illustrate a unit base 2a (in a state where fixed contacts are not mounted) used for a clockwise and counterclockwise rotation switching device of the present invention, wherein FIG. 1A is a perspective view, and FIG. 1B is a partial enlarged view, respectively. Further, FIG. 2A and FIG. 2B illustrate a unit base 2a having fixed contacts mounted thereon, wherein FIG. 2A is a plane view, and FIG. 2B is a partial enlarged view. The unit base 2a has the same main structure as that of the unit base 2 described in FIGS. 6 to 8. For example, the unit base 2a has a pair of circular-shaped fixed contacts 4 and 4 in a plane view in a point symmetric manner. However, the unit base 2a includes a regulation projection 14 having an L shape in a plane view and being provided in a protruding condition as a regulation part on the outer peripheral side of each elastic end 4a of an elastic contact 4 on a bottom plate 13. When a movable contact 11 is moved and contacted with the elastic end 4a, the regulation projection 14 is abutted with the elastic end 4a, which is bent toward the outer peripheral side, so that the regulation projection 14 regulates the movement of the elastic end 4a to the more outer peripheral side. A brush base 3 has the same constitution as that described in FIGS. 6 to 8.

According to the clockwise and counterclockwise rotation switching device having the above-described constitution, when the brush base 3 is rotated from a neutral position of the movable contacts 11 and 11 to the clockwise rotation position, the movable contacts 11 and 11 are moved in the peripheral direction, and contact with the elastic end 4a with outwardly bending the elastic end 4a of the fixed contacts 4 and 4 toward the outer peripheral side as illustrated in FIG. 2. In this state, the elastic end 4a bent toward the outer peripheral side abuts with the regulation projection 14 to regulate more deformation. Thus, when heat or vibration are generated in conjunction with driving of a motor, chattering of the elastic end 4a toward the outer side is suppressed, and a contacting state with the movable contacts 11 and 11 is maintained. This operation is similarly carried out when the brush base 3 is rotated to a counterclockwise rotation position.

Thus, according to the clockwise and counterclockwise rotation switching device in the above-described embodiment 1, an end part of the fixed contact 4 is formed to be the elastic end 4a which is deformed upon contacting with the movable contact 11. Further, the unit base 2a includes the regulation projection 14 regulating a deformation quantity by abutting to the elastic end 4a which is deformed upon the fixed contact 4 being contacted with the movable contact 11. Therefore, it can be prevented to decrease a contact pressure of the elastic end 4a with respect to heat or vibration, so that chattering or fusing is effectively suppressed, and thus the contact durability can be improved. Particularly, this effect can be obtained with a simple structure in which the regulation part 14 is provided. Thus, increase in cost can be minimized.

Embodiment 2

Figure 3A:
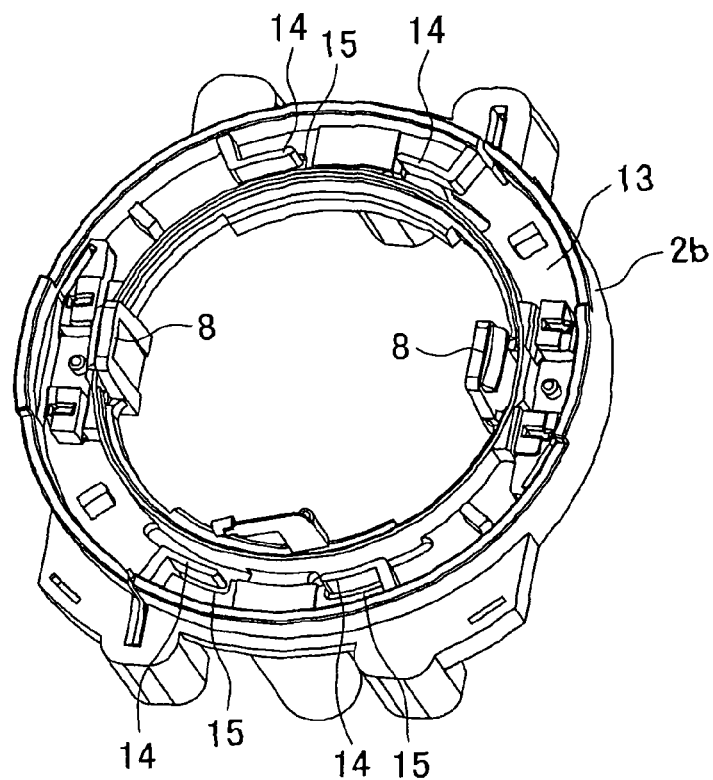
FIG. 3A and FIG. 3B illustrate a unit base of a clockwise and counterclockwise rotation switching device of an embodiment 2.
Figure 3B:
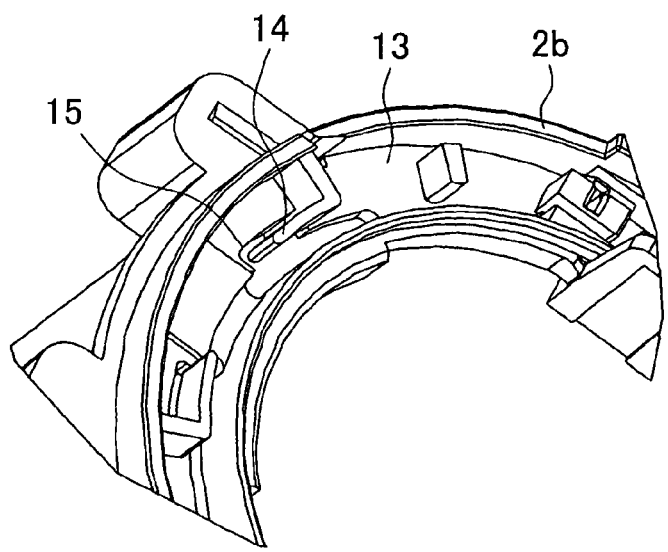

FIGS. 3A and 3B also illustrate the unit base 2b not having fixed contacts, wherein FIG. 3A is a perspective view, and FIG. 3B is a partial enlarged view. The unit base 2b includes a punched hole 15 at a top end of the regulation projection 14 in the bottom plate 13 so as to give elasticity to the top end of the regulation projection 14.

Figure 4:
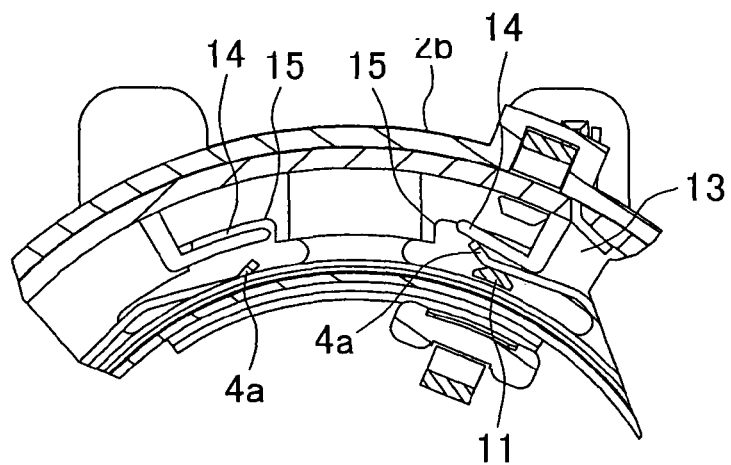
FIG. 4 is a partial enlarged view of a unit base in which contacts are contacted.

According to the present invention, clockwise and counterclockwise switching device, when the brush base 3 is rotated to the clockwise rotation position, the movable contact 11 is contacted with the elastic end 4a of the fixed contact 4, and the elastic end 4a is bent toward the outer peripheral side to abut with the regulation projection 14. Then, as illustrated in FIG. 4, a lower end of the regulation projection 14 is bent toward the outer peripheral side by its elasticity to press the elastic end 4a to the movable contact 11 side. Therefore, when heat or vibration is generated in conjunction with driving of the motor, chattering of the elastic end 4a on the outer peripheral side is suppressed, and thus a contacting state with the movable contact 11 is maintained. This operation is also carried out when the brush base 3 is rotated to a counterclockwise rotation position.

Accordingly, in the clockwise and counterclockwise rotation switching device in the above-described embodiment 2, it can be prevented to decrease a contact pressure of the elastic end 4a with respect to heat or vibration, so that chattering or fusing is effectively suppressed, and thus the contact durability can be improved with a simple structure in which the regulation projection 14 is provided. Particularly, the regulation projection 14 has elasticity so as to be deformed by abutting the elastic end 4a, a problem due to dimensional tolerance does not occur, and a space between the regulation projection 14 and the elastic end 4a is not formed. Therefore, the embodiment 2 can more reliably suppress chattering or fusing of the elastic end 4a than the embodiment 1.

Figure 5:
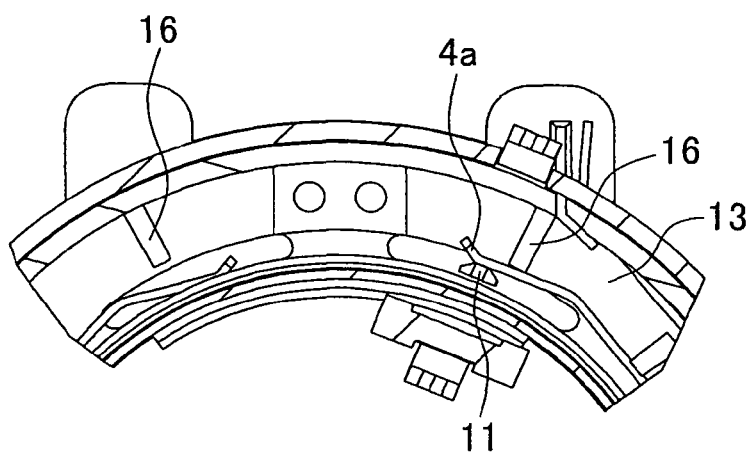
FIG. 5 is a partial enlarged view of a unit base of a varied example.

In addition, a shape of a regulation part is not limited in an L-shaped regulation projection as described above. The shape can be properly changed as long as it can regulate the deformation quantity of an elastic end. For example, the regulation part can be a regulation projection 16 which is a wall along the radius direction as illustrated in FIG. 5, a wall along the peripheral direction, or a circular projection. Further, a method to give elasticity to the regulation part is not limited to a method to form a punched hole. For example, the regulation part can have elasticity by changing a thickness of a wall. Of course, the regulation part is not limited to be integrally formed with the unit base, and can be a resin or metallic plate material or a plate spring which is separated from the unit base.

Further, in the above embodiments, the elastic end is deformed toward the outer periphery side. When the elastic end is deformed toward an inner periphery side, chattering or fusing of the elastic end can be similarly prevent by providing the regulation part on the inner periphery side.

In the above-described embodiments, both the ends of the fixed contact on the unit base side are formed to be elastic ends and bent by abutting to the movable contact, which does not have an elastic end, on the brush base side. However, it is possible to make this case mutually reverse, that is, both ends of the movable contact on the brush base side can be formed to be elastic ends, and can be bent by abutting to the fixed contact, which does not have an elastic end, on the unit base side. In this case, the regulation part is provided on the lower face side of the brush base.

In addition, the present invention can be used for a power tool having a switching function for a clockwise or counterclockwise rotation direction of a motor such as a motor-driven drill, a motor-driven driver drill or a motor-driven driver.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A clockwise and counterclockwise rotation switching device of a power tool to select a clockwise rotation or a counterclockwise rotation of a motor, the clockwise and counterclockwise rotation switching device comprising:
   a unit base being fixed in the power tool and having a pair of fixed contacts; and
   a brush base being rotatably provided with respect to the unit base, having a pair of movable contacts positioned between the fixed contacts, and switching a contacting mode of the movable contact with respect to the fixed contacts by a rotation operation,
   wherein an end part of any one of the fixed contact and the movable contact is formed to be an elastic end being deformed in contact with the other contact, and
   wherein the unit base or the brush base is provided with a regulation part abutting with the elastic end so as to regulate a deformation quantity of the elastic end which deforms when the fixed contact is contacted with the movable contact and wherein the movable contacts are rotatably provided with respect to the regulation part and the fixed contact is provided between the regulation part and the movable contact or the movable contact is provided between the regulation part and the fixed contact when the fixed contact is contacted with the movable contact.

2. The clockwise and counterclockwise rotation switching device of the power tool according to claim 1,
   wherein the regulation part has elasticity to be deformed by an abutment with the elastic end.

3. The clockwise and counterclockwise rotation switching device of the power tool according to claim 2,
   wherein a top end position of the regulation part in the unit base or the brush base has a punched hole so as to give elasticity to the regulation part.

4. The clockwise and counterclockwise rotation switching device of the power tool according to claim 1,
   wherein the regulation part is a regulation projection provided on an outer peripheral side of the elastic end of the fixed contact and having an L shape in a plane view.

5. The clockwise and counterclockwise rotation switching device of the power tool according to claim 1,
   wherein the fixed contact has a circular shape in a plane view, and has an elastic end movable in a radius direction of the unit base, and
   wherein when the movable contact is moved in a peripheral direction in conjunction with a rotation of the brush base, the movable contact is moved toward an inner peripheral side of the elastic end to contact while outwardly pushing the elastic end toward an outer peripheral side.

6. The clockwise and counterclockwise rotation switching device of the power tool according to claim 1,
   wherein the regulation part is a wall along a radius direction of the unit base or the brush base.

7. The clockwise and counterclockwise rotation switching device of the power tool according to claim 1,
   wherein the unit base is formed to have a disk-ring shape, and
   wherein the brush base is coaxially attached to an upper part of the unit base.

8. The clockwise and counterclockwise rotation switching device of the power tool according to claim 7,
   wherein a hook provided on an inner periphery of the unit base is engaged with a recessed part formed in a peripheral direction on an inner periphery of the brush base, and
   wherein the brush base is rotatably connected on the unit base.

9. The clockwise and counterclockwise rotation switching device of the power tool according to claim 1,
   wherein the movable contact is connected with a brush holder.

10. The clockwise and counterclockwise rotation switching device of the power tool according to claim 1,
    wherein the fixed contact is integrally formed with an insertion piece to be inserted into a terminal on a coil side and electrically connected.

11. The clockwise and counterclockwise rotation switching device of the power tool according to claim 1,
    wherein the brush base comprises an operation projection on a side surface of the brush base.

12. The clockwise and counterclockwise rotation switching device of the power tool according to claim 1,
    wherein the regulation part is integrally formed with the unit base or the brush base.

* * * * *